United States Patent

[11] 3,584,736

[72] Inventors Howard R. De Mallie
Rochester;
Eugene Lemieux, Albion; Grant J. Kothiringer, Webster, all of, N.Y.
[21] Appl. No. 808,770
[22] Filed Mar. 20, 1969
[45] Patented June 15, 1971
[73] Assignee Eastman Kodak Company
Rochester, N.Y.

[54] CONVEYOR AND METHOD OF CONVEYING OBJECTS HAVING CYLINDRICAL SURFACES
5 Claims, 4 Drawing Figs.

[52] U.S. Cl. .................................................. 198/219,
198/27, 214/130 C
[51] Int. Cl. .................................................. B65g 25/04
[50] Field of Search.......................................... 214/1 P, 1
PL, 1 P2, 1 R, 1 RA, 130 C; 198/218, 219, 27

[56] References Cited
UNITED STATES PATENTS

| | | | |
|---|---|---|---|
| 1,158,289 | 10/1915 | Reininger.................... | 214/1 R |
| 1,836,690 | 12/1931 | Talbot......................... | 214/1 R |
| 2,144,281 | 1/1939 | Wuest......................... | 198/218 X |
| 2,733,641 | 2/1956 | Praeg.......................... | 214/1 P2 |
| 2,893,348 | 7/1959 | Pearson....................... | 214/1 P2X |
| 2,916,164 | 12/1959 | Avery.......................... | 214/1 RA |

*Primary Examiner*—Albert J. Makay
*Attorneys*—Walter O. Hodsdon and William E. Jackson ABSTRACT: A method of conveying and a conveyor for large heavy rolls of photographically sensitized webs (e.g. paper, film). The conveyor includes four pivotally mounted saddle assemblies which include saddle members which interleave according to a sequence controlled by a hydraulic and electronic control system. The saddle assemblies support and move rolls of product along a path defined by a series of intersecting arcs. The rolls are transferred from one saddle assembly to the next at the points of intersection. The method includes the steps of: (a) supporting the cylindrical surface of the roll on a first pivotal support, (b) pivoting said support to move said object along a path defined by an arc, (c) maintaining said surface substantially stationary relative to said support during the pivoting step (b), (d) lifting said object from said first pivotal support with a second pivotal support, and repeating steps similar to steps (b) and and c). Peripheral damage to the rolls, which might occur if they were conveyed by rolling for substantial distances, is substantially eliminated by the described conveyor and method.

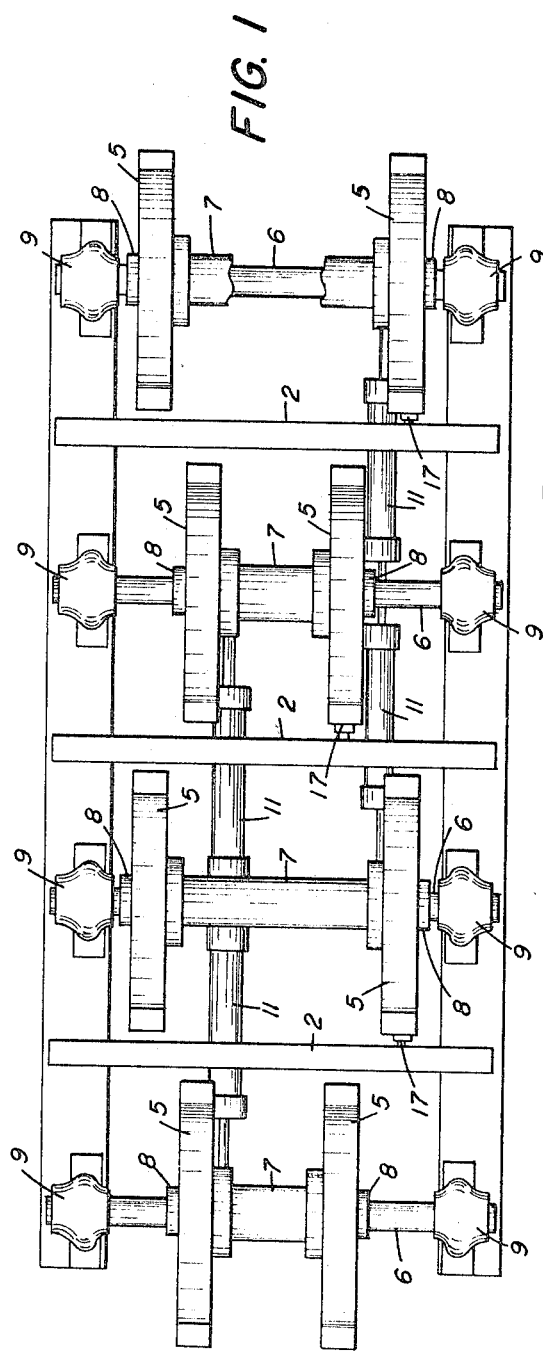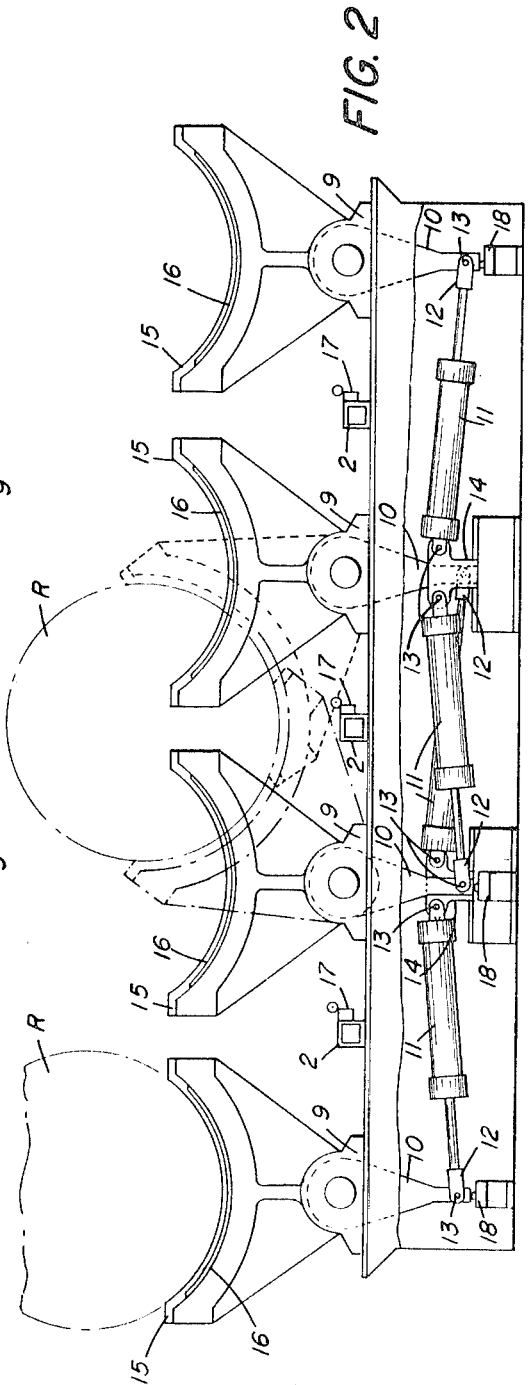

EUGENE LEMIEUX
HOWARD R. DeMALLIE
GRANT J. KOTHIRINGER
INVENTORS

ATTORNEYS

CONVEYOR AND METHOD OF CONVEYING OBJECTS HAVING CYLINDRICAL SURFACES

The present invention relates to conveying and, more particularly, to an apparatus for conveying objects having cylindrical surfaces.

Various conveyors have been used to transfer heavy objects having cylindrical surfaces from one place to another. These conveyors have been found especially desirable in production lines where rolls of product must be moved safely and reliably to or from a machine which performs some operation on the product. One such conveyor is disclosed in U.S. Pat. No. 2,737,306. This conveyor includes a plurality of pivotable saddles for receiving coils of sheet metal and means for moving the saddles to cause the coils to roll for substantial distances on their peripheries between adjacent saddles. Several coils are stored on this conveyor to insure a supply to a cradle-type reel. While the above conveyor and its method of operations are suitably adapted to store and transfer rolls of sheet metal, they would tend to produce undesirable damage to objects made of less durable material such as photographic film or paper which have sensitized coatings. In case of the latter materials, a transfer by rolling for substantial distances between saddles would tend to damage the cylindrical surface and/or its coatings by abrasion, impact forces, or crushing pressures.

Accordingly, an object of the present invention is to provide an apparatus for transferring objects having cylindrical surfaces form one position to another without rolling of the objects for substantial distances.

Another object of the present invention is to provide an apparatus which can transfer objects in one direction or an opposite direction.

A further object of the invention is to provide an apparatus for transferring and storing large heavy rolls of unexposed photographic product without damaging the photographic sensitivity of said product.

Still another object of the invention is to provide a conveying and storing apparatus which is adapted to be operated by automatic control systems with a minimum of assistance from operating personnel.

Other objects and advantages of the present invention will be apparent to those skilled in the art by the description of preferred embodiments of the invention which follows.

An apparatus for conveying objects having cylindrical surfaces comprises one aspect of the present invention. According to this aspect, an object (objects) moves in successive arcuate paths while the cylindrical surface thereof is supported on respective pivoted supports. Damage to the cylindrical surface by abrasion, or the like, is substantially eliminated by maintaining said surface substantially stationary relative to the respective support during the pivoting of the same. The apparatus is of particular advantage in conveying large heavy rolls of products which are easily susceptible to damage from abrasion, impact, pressure, or the like.

A conveyor for moving objects having cylindrical surfaces comprises another aspect of the present invention. According to this aspect, a conveyor includes at least three successive means for moving an object in arcuate paths, respectively, from a first to a second, the second to a third, and the third to a fourth position. The object, when in the second and third positions, is transferred between the adjacent moving means. Each of the moving means includes means for engaging the cylindrical surface for maintaining this surface and said engaging means substantially stationary relative to one another when they are in engagement during movement of the object. This conveyor eliminates damage to the cylindrical surface of the object which might otherwise occur if the object were rolled from one position to another. One form of conveyor according to the present invention utilizes a plurality of saddle members which are pivotally mounted and are moved by torque supplied from hydraulic cylinder means. The conveyor, according to other forms of the present invention, is provided with saddle members which have resilient padding to protect the conveyed object and/or means to produce a signal in response to various positions of the object and saddle members. The signal is used to activate automatic control means for the operation of the conveyor.

While the detailed description which follows sometimes refers to "roll(s) of photographic paper" or "roll(s) R" it should be understood that this is by way of example and not limitation as to various aspects of the present invention. The phrase, "objects having a cylindrical surface," is intended to refer generically to cylinders, objects comprising more than one cylindrical surface, and objects which have substantially cylindrical surfaces. It should also be understood that the various aspects of the present invention can be adapted to moving objects up or down an inclined, or vertical, direction.

Reference is now made to the accompanying drawings wherein like reference numerals and characters designate like parts and wherein:

FIG. 1 is a plan view of a conveyor according to one embodiment of the present invention.

FIG. 2 is an elevation view, with portions broken away, of the embodiment of FIG. 1.

For convenience of description, the disclosure of the various aspects of the present invention will be divided into two parts. The description will be presented under the headings "Overall Conveyor" and "Method of Conveying."

OVERALL CONVEYOR

Figure 3:
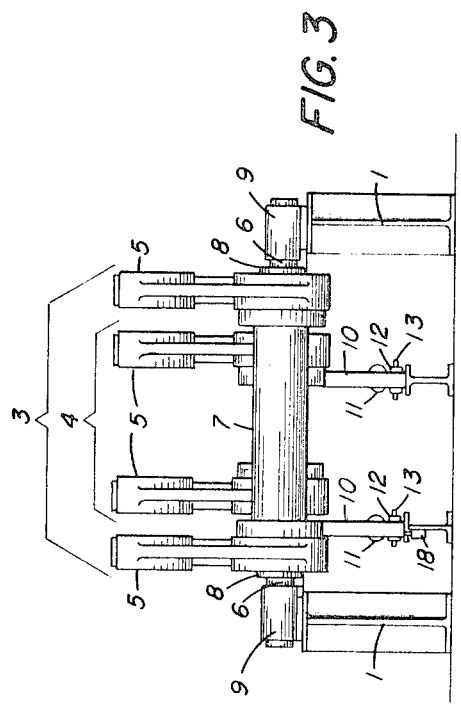
FIG. 3 is an end view of the embodiment of FIGS. 1 and 2.

Referring to the drawings, one embodiment of the invention selected for illustration is disclosed in FIGS. 1 through 3. A frame is constructed from two parallel beams 1 which are secured to the floor for rigidity. Tie bars 2 span the beams 1 and are rigidly attached thereto by means of welding, bolts, or the like. Four saddle assemblies are mounted on the beams 1. The saddle assemblies having relatively closely spaced saddles 5 are sometimes referred to as the inner saddle assemblies 4. The saddle assemblies having the wider spacing between saddles 5 are sometimes referred to as the outer saddle assemblies 3. As shown in phantom in FIG. 2, this preferred manner of offsetting adjacent saddle pairs enables them to be interleaved during the transfer of the object between adjacent saddle paris. Each of the saddle assemblies 3 and 4 include a shaft 6 for pivotally mounting the assembly. Connecting the two saddles 5 of each assembly is a flanged torque tube 7. Shaft collars 8 are secured to the shaft 6 to hold the interconnected pair of saddles 5 in their position between the beams 1. The shafts 6 for each saddle assembly are securely clamped by split blocks 9 which are rigidly secured to beams 1.

The saddle assemblies are pivoted by a hydraulic and electronic control system which includes hydraulic cylinders 11. The piston of each cylinder 11 is attached to operating link 10 by means of a yoke 12 and pin 13. The other end of cylinder 11 is mounted on bracket 14 by another pin. Since lever 10 is rigidly secured to a torque tube 7 which is, in turn, rigidly connected to saddles 5, a force applied to the end of lever 10 will cause the saddles 5 to pivot about the axis defined by the stationary shafts 6. The actuation of hydraulic cylinders 11 is accomplished by other elements of a hydraulic and electronic system (not shown). To aid in the automatic operation of the conveyor, a pressure switch 16 is mounted under the pad 15 of each saddle 5. This switch 16 is actuated by the weight of objects placed in the saddle assembly. To further aid automatic operation of the conveyor, microswitches 17 are provided on each tie bar 2 and microswitches 18 are mounted on brackets 19 beneath the lower end of operating levers 10. The switch 17 is contacted and actuated by the saddle 5 when the saddle assembly is pivoted to its extreme counterclockwise position, as best illustrated in FIG. 2. Microswitch 18 is contacted and actuated by the end of lever 10 when the saddle assembly is in a vertical position. Switches 16, 17, and 18 produce signals which are used to actuate solenoid valves in the hydraulic and electronic control system for hydraulic cylinders 11. The operation of the inner and outer saddle assemblies, 3 and 4 respectively, will be discussed in more detail at a later point in the specification.

The above-described conveyor has been found to be especially useful in conveying and storing large rolls of photographically sensitized paper. These rolls, which weigh about 1,500 pounds and are 32 inches in diameter, are safely handled by a conveyor having a length of about 113 inches. The hydraulic cylinders 11 were a type having a 3¼ bore and a 14-inch stroke, which type is sold under the trade name of "Vickers Power Pack." The top surfaces of the saddles 5 were covered with a pad 15 composed of 3¾-inch soft sheet neoprene (durometer −45) which were cemented in place with a canvas covering. It was found that the periphery of a large heavy roll of photographic paper was adequately protected from damage by this padding.

METHOD OF CONVEYING

Figure 4:
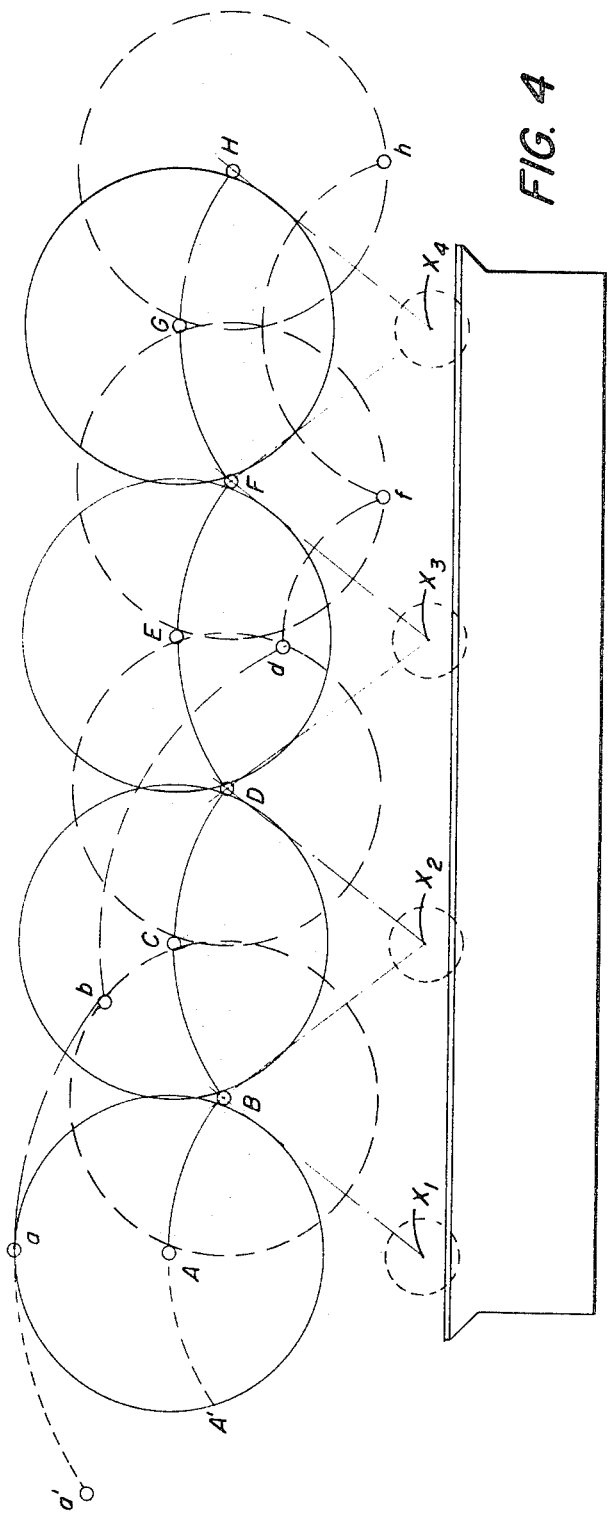
FIG. 4 is a schematic elevation view of the embodiment of FIG. 2 and shows the paths and positions of an object as it is conveyed from left to right.

Referring to the drawings, one embodiment of the method selected for illustration is disclosed in FIG. 4. This figure schematically illustrates the various paths of movement of a cylindrical object when conveyed according to the present method. For convenience of description, FIG. 4 will be discussed with reference to objects which are conveyed from left to right. It should be understood that the invention is not limited to this direction and that the method can be carried out in a reversed direction.

According to the illustrated method, a roll R is supported on a first support which pivots about point $X_1$. In the loading position for roll R, its central axis passes through point A. If desired, the loading position could be arranged at point $A^1$ as shown in dotted lines. After roll R is supported with its center at A, it is moved along the path defined by arc A–B. The center of curvature for this arc coincides with point $X_1$. When in point B, the roll R is lifted from its first pivotal support by a second pivotal support which pivots around point $X_2$. After roll R is supported on said second pivotal support at point B, it is moved along the path defined by the arc BCD. The center of curvature for this arc coincides with point $X_2$. In the position, D, the roll R can be transferred to a third pivotal support means to a position F in a manner analogous to the ones described. The method of conveying roll R could be extended for many repetitions of the described steps to convey the roll R for any desired distance.

While the roll R is being conveyed according to the illustrated method, the surface of the roll is maintained substantially stationary relative to the respective pivotal supports. This is illustrated by the path that a point on the surface of the roll follows when the roll R moves from the first position A to the second and third positions, B and D respectively. When the roll R moves from A to B, the point located at (a) moves to position (b) along an arc having a center of curvature at $X_1$. When the roll R moves from B to D along arc BCD, the point located at (b) moves to position (d) along an arc having a center of curvature at $X_2$. Thus, each time the roll R is moved by a pivotal support, they both pivot around the same center as a unit.

The path ABCDEFGH, shown in FIG. 4, is the one followed by the center of a roll R when it is conveyed according to the operation of the conveyor shown in FIGS. 1 through 3. The hydraulic and electronic control system for the conveyor receives signals from switches 16, 17, and 18 as the saddle assemblies pivot toward and away from each other as they pass the roll R from left to right. To load the conveyor, a fork lift operator first deposits a roll R into the inner saddle assembly 4 on the left-hand of the conveyor. The inner saddle assembly 4 is in a vertical position when the roll is deposited thereon with its center in a position corresponding to point A in FIG. 4. After the operator has backed the fork lift truck out of the way and is assured that the roll R is properly seated and that all is clear, he pushes a button to initate the conveying of the roll R. The left-hand inner saddle assembly 4 moves the roll R clockwise along an arcuate path from point A to B. At point B, the roll R is received by an outer saddle assembly 3 which has been pivoted to its extreme counterclockwise position. The outer saddle assembly 3 then moves the roll R along an arcuate path from position B to D where the roll is received by another inner saddle assembly 4 which has pivoted to its extreme counterclockwise position. The latter inner saddle assembly 4 other moves the roll R clockwise along an arcuate path from position D to F. At point F, another outer saddle assembly 3 receives the roll R which is then lifted and pivoted along an arcuate path from position F to a vertical position G.

The control system insures that saddle assemblies will automatically forward rolls as adjacent saddle assemblies are emptied and tilted to roll-receiving positions. Thus, the fork lift operator can load rolls at the left end of the conveyor until all saddle assemblies support rolls.

The operator then actuates another button which causes the roll R in the right end saddle assembly to be pivoted to position H where the roll R is unloaded from the conveyor. After roll R is unloaded, the saddle assemblies automatically advance rolls from left to right leaving the left saddle assembly empty and ready for reloading. The hydraulic and electronic control system insures that the saddle assemblies 3 and 4 are pivoted in the correct interleaving sequence. Also, the control system includes an interlock control feature which will prevent a roll R from being passed from one saddle assembly to another unless the receiving saddle assembly is empty and in a position to receive a roll. In addition to the above cycle, where the roll is progressively passed from position A to H (FIG. 4), it is possible to reverse the direction of conveying. This is not done automatically inasmuch as an operator is required to push a button for each saddle assembly to override the normal left-to-right cycle of operation of the control system.

It should be apparent that the present invention provides storage for a plurality of rolls R and conveys them when desired. In this regard, the storage of rolls is accomplished by providing controls to stop the saddle assemblies in their vertical positions as illustrated schematically by points A, C, E, and G in FIG. 4.

The invention has been described in detail with particular reference to preferred embodiments thereof, but it will be understood that variations and modifications can be effected within the spirit and scope of the invention.

We claim:

1. A conveyor for moving an object having a cylindrical surface, said conveyor comprising:
   first means for moving said object from a first position to a second position along an arcuate path;
   second means for receiving said object from said first means and for moving said object from said second position to a third position along an arcuate path;
   third means for receiving said object from said second means and moving said object from said third position to a fourth position along an arcuate path;
   each of said moving means including:
   a shaft to define an axis for said arcuate path;
   means mounting said shaft on a frame;
   two saddle members pivotably mounted in spaced relationship on said shaft and having respective concave cylindrical surfaces for engaging the cylindrical surface of said object for maintaining said object's surface and said saddle member's surfaces substantially stationary relative to one another when they are in engagement during movement along respective arcuate paths;
   a torque tube concentric with said shaft and having its opposite ends respectively attached to said saddle members; and an operating lever having one end attached to said torque tube and the other end attached to a fluid actuated cylinder means for applying torque to said saddle members for moving said object along said arcuate path.

2. The invention of claim 1 wherein said respective concave cylindrical surfaces on said two saddle members are formed from a resilient padding material.

3. The invention of claim 1 further including means for producing a respective signal when said object is in any of the four mentioned positions and when said object is at an intermediate position between any of the four mentioned positions.

4. A conveyor for moving an object having a cylindrical surface, said conveyor comprising:

first means for moving said object from a first position to a second position along a first arcuate path so as to displace said object in such manner that the axis of said object in said second position is parallel to the axis of said object when in said position, said first moving means including:
a. means for defining a first axis for said first arcuate path;
b. a first pair of pivotable saddle members mounted in axially spaced relationship of said first axis defining means, said first saddle member having respective first concave cylindrical surfaces for engaging the cylindrical surface of said object to substantially prevent movement of said object with respect to said first cylindrical surfaces and the axis of each of said first cylindrical surfaces being aligned with respect to one another and in parallel spaced relationship from said first axis; and
c. first saddle pivoting means operatively connected to said first saddle members for pivoting said first saddle members about said first axis;

second means for receiving said object from said first means and for moving said object from said second position to a third position along a second arcuate path so as to displace said object in such manner that the axis of said object in said third position is parallel to the axis of said object when in said second position, said second moving means including:
a. means for defining a second axis for said second arcuate path, said second axis being in parallel spaced relationship from said first axis;
b. a second pair of pivotable saddle members mounted in axially spaced relationship on said second axis defining means in offset relationship with respect to said first saddle members so as to permit said first and second saddle members to be interleaved, said second saddle members having respective second concave cylindrical surfaces for engaging the cylindrical surface of said object to substantially prevent movement of said object with respect to said second concave cylindrical surfaces and the axis of each of said second concave cylindrical surfaces being aligned with respect to one another and in parallel spaced relationship from said second axis; and
c. second saddle pivoting means operatively connected to said second saddle members for pivoting said second saddle members about said second axis so that when said first and second saddle members are in said second position said first and second saddle members are in interleaving relationship for transfer of said cylindrical object without substantial rolling of said object during the transfer thereof.

5. The invention according to claim 4 wherein said first and second axis defining means each includes a shaft for mounting a respective pair of saddle members and wherein said first and second saddle pivoting means each includes:

a torque tube concentric with a respective shaft; and
an operating lever having one end attached to said torque tube and the other end attached to a fluid actuated cylinder means for applying torque to said respective pair of saddle members for moving said object along the respective arcuate path.